(12) United States Patent
Yasui

(10) Patent No.: US 7,247,327 B2
(45) Date of Patent: Jul. 24, 2007

(54) PROCESS FOR PRODUCING WORT FOR FERMENTED MALT DRINKS

(75) Inventor: Tetsuji Yasui, Kanagawa (JP)

(73) Assignee: Kirin Beer Kabushiki Kaisha, Tokyo (JP)

( * ) Notice: Subject to any disclaimer, the term of this patent is extended or adjusted under 35 U.S.C. 154(b) by 332 days.

(21) Appl. No.: 10/275,695

(22) PCT Filed: May 9, 2001

(86) PCT No.: PCT/JP01/03868

§ 371 (c)(1),
(2), (4) Date: Nov. 8, 2002

(87) PCT Pub. No.: WO01/85899

PCT Pub. Date: Nov. 15, 2001

(65) Prior Publication Data
US 2003/0113404 A1 Jun. 19, 2003

(30) Foreign Application Priority Data
May 12, 2000 (JP) ............................. 2000-140900

(51) Int. Cl.
*C12G 3/00* (2006.01)
(52) U.S. Cl. ......................................... 426/15; 426/592
(58) Field of Classification Search .................. 426/15, 426/592; 99/276
See application file for complete search history.

(56) References Cited

U.S. PATENT DOCUMENTS 3,908,021 A * 9/1975 Rehberger et al. ............ 426/16
5,612,072 A * 3/1997 Lommi et al. ................ 426/11

FOREIGN PATENT DOCUMENTS

| CA | 2 052 435 A | 4/1993 |
|---|---|---|
| EP | 0 773 285 A2 | 5/1997 |

OTHER PUBLICATIONS

Hardwick, Handbook of Brewing, p. 291, Marcel Dekker Inc., 1996.*
Schwartz, http://web.archive.org/web/19991013143715/http://home.elp.rr.com/brewbeer/files/nbsparge.html.*
Yasui, "Beer no cardbord-shu ni tsuite," Nippon Jouzou Kyoukaishi, Feb. 2001, vol. 96, No. 2, pp. 94-99.
Lermusieau et al., "Nonoxidative mechanism for development of trans-2-nonenal in beer," Journal of the American Society of Brewing Chemists, (1999), 57 (1), pp. 29-33.
Dale et al., "A means to reduce formation of precursors of 2-trans-nonenal in brewing," Journal of The Institute of Brewing (1977), 83, pp. 88-91.

(Continued)

*Primary Examiner*—Anthony Weier
(74) *Attorney, Agent, or Firm*—Foley and Lardner LLP

(57) ABSTRACT

The present invention provides a process for producing a wort with reduced content of a stale flavor-causing substance for the production of fermented malt beverages such as beer and the like in which generation of a stale flavor is suppressed, and it also provides fermented malt beverages in which generation of a stale flavor is suppressed such as beer and the like, that are produced by using wort with low content of a stale flavor-causing substance obtained by this process for producing. The second wort with reduced content of a stale flavor-causing substance is obtained with trans-2-nonenal potential (NP) as an indicator in the wort separation of a prepared wort in the production of fermented malt beverages. Fermented malt beverages with suppressed generation of a stale flavor-causing substance is produced by using wort in which NP in the whole wort is reduced by at least 1 ppb in terms of sugar content 11° p.

8 Claims, 1 Drawing Sheet

OTHER PUBLICATIONS

Drost et al., "Flavor stability," Journal of the American Society of Brewing Chemists (1990), 48 (4), pp. 124-131.

Nomura et al., "Reduction of stale aldehyde of beer with membrane fraction of acetic acid bacteria," BioScience, Biotechnology, and Biochemistry (1998), 62(5), pp. 990-992.

Sophie et al., "The use of oxygen18 in appraising the impact of oxidation process during beer storage," Journal of the Institute of Brewing (1999), 105(5), pp. 269-274.

Sophie et al., "Release of deuterated nonenal during beer aging from labeled precursors synthesized in the boiling kettle," Journal of Agricultural and Food Chemistry (1999), 47 (10), pp. 4323-4326.

Nyborg et al., "Investigations of the protective mechanism of sulfite against beer staling and formation of adducts with trans-2-nonenal," Journal of the American Society of Brewing Chemists (1999), 57 (1), pp. 24-28.

* cited by examiner

PROCESS FOR PRODUCING WORT FOR FERMENTED MALT DRINKS

This application is filed pursuant to 35 USC 371 of international patent application PCT/JP01/03868, filed May 9, 2001, and claiming priority from Japan Application 2000-140900 filed may 12, 2000.

TECHNICAL FIELD

The present invention relates to a process for producing wort for the use of production of fermented malt beverages such as beer and the like, in which the generation of a stale flavor is suppressed, and more particularly to the process for producing wort whose content of a stale flavor-causing substance is reduced during the wort production steps for producing fermented malt beverages such as beer and the like.

BACKGROUND ARTS

In fermented malt beverages such as beer and the like with malt as a raw material, chemical reactions such as oxidation and the like are accelerated due to the passage of time, the rise in temperature, and so on, thereby deterioration of the products is progressed. Products once deteriorated suffer damage to their original taste and flavor contained in fermented malt beverages and their quality is deteriorated. In order to prevent such quality deterioration in fermented malt beverages, various attempts have been made as shown below.

The publication of Japanese Laid-Open Patent Application No.1993-137555 describes a process referring to the use of malt wherein lipid is removed in advance from the beer malt by sub-critical or super-critical carbon dioxide, as a process for producing beer with the use of malt from which lipid, which damages quality, has been selectively and efficiently removed without affecting enzymes in the malt, in beer or in the beer production steps. According to the description, the filtering efficiency, foam-lastingness and flavor stability will improve, yet this process requires a step of treating raw materials with super-critical carbon dioxide, which leads to the increase in the production cost.

The publication of Japanese Laid-Open Patent Application No.2000-4867 describes as a production process for malt alcoholic beverages with high flavor lastingness and a management method for controlling the generation of a substance which indicates the flavor lastingness in an intermediate sample in the production process for malt alcoholic beverages including the steps of: selection of raw materials including malt; wort production; fermentation; maturation; filtration; and container filling. The description continues that 5-hydroxymethylfurfural (5-HMF) or its precursor is selected as an indicator for flavor lastingness and malt alcoholic beverages with high flavor lastingness can be produced by successfully suppressing this indicator substance in the course of production. It further discloses specific examples including a method of suppressing 5-HMF generation by adding an amino acid which has a thiol group and a method of giving the anti-oxidation property to the wort by the addition of catechin. But in order to raise the effectiveness of suppressing 5-HMF generation, multiple execution of the treatment process will be required and the steps are anticipated to become complicated.

The following mechanisms have been presented with regard to the generation of a beer stale flavor which deteriorates the taste of fermented malt beverages such as beer and the like. They are: Maillard reaction and Strecker degradation of amino acids; autoxidation of fatty acids and enzymatic oxidation of lipids; oxidative degradation of a bitter substance in the hop, oxidation of higher alcohols by melanoidines, oxidation of the unsaturated hydroxyfatty acid or alcohols catalyzed with a metal ion (Cu, in particular); and oxidation of a higher alcohol. These or some among these are thought to be involved in the generation of a stale flavor (Hideo MIYAJI, "Beer Brewing Technology", Shokuhin Sangyo Shimbunsha, Co., Ltd., published on Dec. 28, 1998; pp. 418–424).

On the other hand, a stale flavor itself has been studied. Trans-2-nonenal is exemplified as one of the substances causing a stale flavor. One of the generation pathways for this substance is as follows: a trans-2-nonenal precursor (a hydroxide derivative), derived from lipid or the fatty acid in the raw material, is generated upon both enzymatic and non-enzymatic oxidations in the course of wort preparation, which further leads to the generation of trans-2-nonenal through the oxidative degradation. It is argued that, even though the above-mentioned precursor is removed to a high degree in the courses of fermentation and maturation, the precursor transfers on to the finished beer and then, by the later oxidation, trans-2-nonenal generates in the beer and the like. It is, however, rather thought that trans-2-nonenal produced in the wort forms Schiff bases with primary amines, such as amino acids, in the wort and that some of the Schiff bases are passed on to the beer and the like, where trans-2-nonenal is freed from Schiff bases depending on the temperature- or pH-condition, although many of them are removed in the courses of fermentation and maturation (Lermusieau et al., J. Am. Soc. Brew. Chem. 57, 1999, p29–33).

The subject of the present invention is to provide a process for producing wort with reduced content of a stale flavor-causing substance for the purpose of producing fermented malt beverages such as beer and the like in which a stale flavor generation is suppressed, and to provide fermented malt beverages such as beer and the like in which a stale flavor generation is suppressed, that are produced by using wort with low content of a stale flavor-causing substance obtained by this production process.

In the course of studying the suppression of the generation of a stale flavor in beer, the present inventor focused on trans-2-nonenal among various substances causing a stale flavor and analyzed in details the behavior of a trans-2-nonenal precursor in the beer production steps. The present inventor then found out that in order to estimate the levels of trans-2-nonenal in the beer products generated during storage, it is important to grasp prosperity and decay of a trans-2-nonenal precursor in the wort, and that the trans-2-nonenal level, in the wort adjusted to a certain pH and boiled for a certain time, namely trans-2-nonenal potential (hereinafter NP), serves as an effective indicator for a stale flavor generated in the beer products. In addition, the present inventor found out that sugar content in the sparged wort decreases gradually since the last extract is washed out of the spent grains, whereas NP content holds a high level without correlating to the decrease in sugar content during sparging. The present invention has come to the completion based on these findings.

DISCLOSURE OF THE INVENTION

The present invention relates to: a process for producing wort for fermented malt beverages wherein a reducing treatment is performed for a stale flavor-causing substance in the second wort in the mash separation process in course of the production of fermented malt beverages, to obtain the second wort with reduced content of a stale flavor-causing substance (claim 1); the process for producing wort for fermented malt beverages according to claim 1, wherein the reducing treatment of a stale flavor-causing substance is performed with the trans-2-nonenal potential as an indicator (claim 2); the process for producing wort for fermented malt beverages according to claim 2, wherein the reducing treatment of a stale flavor-causing substance in the second wort is performed so that the trans-2-nonenal potential in the whole wort from mash separation process is reduced by at least 1 ppb in terms of sugar content 11° p (claim 3); the process for producing wort for fermented malt beverages according to any one of claims 1–3, wherein the reducing treatment of a stale flavor-causing substance is a suppressing treatment of the elution of a stale flavor-causing substance from the spent grains into the second wort in sparging step which is a treatment to restrict the carry-over of a stale flavor-causing substance into the second wort (claim 4); the process for producing wort for fermented malt beverages according to claim 4, wherein the treatment to restrict the carry-over of a stale flavor-causing substance into the second wort is a treatment to suppress the elution of a stale flavor-causing substance from the spent grains into the second wort in sparging step (claim 5); the process for producing wort for fermented malt beverages according to claim 5, wherein the treatment to suppress the elution of a stale flavor-causing substance is a treatment using hot water for the sparging which contains calcium salts and organic acids (claim 6); the process for producing wort for fermented malt beverages according to claim 5, wherein the treatment to suppress the elution of a stale flavor-causing substance is a treatment using hot water for the sparging which can lower the temperature in the spent grains layer to 70° C. or under (claim 7); the process for producing wort for fermented malt beverages according to claim 4, wherein the treatment to restrict the carry-over of a stale flavor-causing substance into the second wort is a treatment to control the supply of hot water for the sparging so that the sparging is completed with sugar content of the second wort not ranging below 3° p (claim 8); the process for producing wort for fermented malt beverages according to claim 4, wherein the treatment to restrict the carry-over of a stale flavor-causing substance into the second wort is a treatment to restrict the elution of a stale flavor-causing substance by using the second wort again during mashing process (claim 9); the process for producing wort for fermented malt beverages according to claim 9, wherein the elution of a stale flavor-causing substance is restricted by using mashing-in water, a part of which is replaced with the second wort (claim 10); the process for producing wort for fermented malt beverages according to any one of claims 1–3, wherein the reducing treatment of a stale flavor-causing substance is a removing or reducing treatment of a stale flavor-causing substance in the second wort (claim 11); the process for producing wort for fermented malt beverages according to claim 11, wherein the removing or reducing treatment of a stale flavor-causing substance in the second wort is a removing or reducing treatment in which a part or a whole of the second wort is made to contact the activated carbon (claim 12); and a fermented malt beverage with suppressed generation of a stale flavor which is obtained through the fermentation step from the wort produced by the process for producing wort for fermented malt beverages according to any one of claims 1–12 (claim 13).

BEST MODE OF CARRYING OUT THE INVENTION

Figure 1:
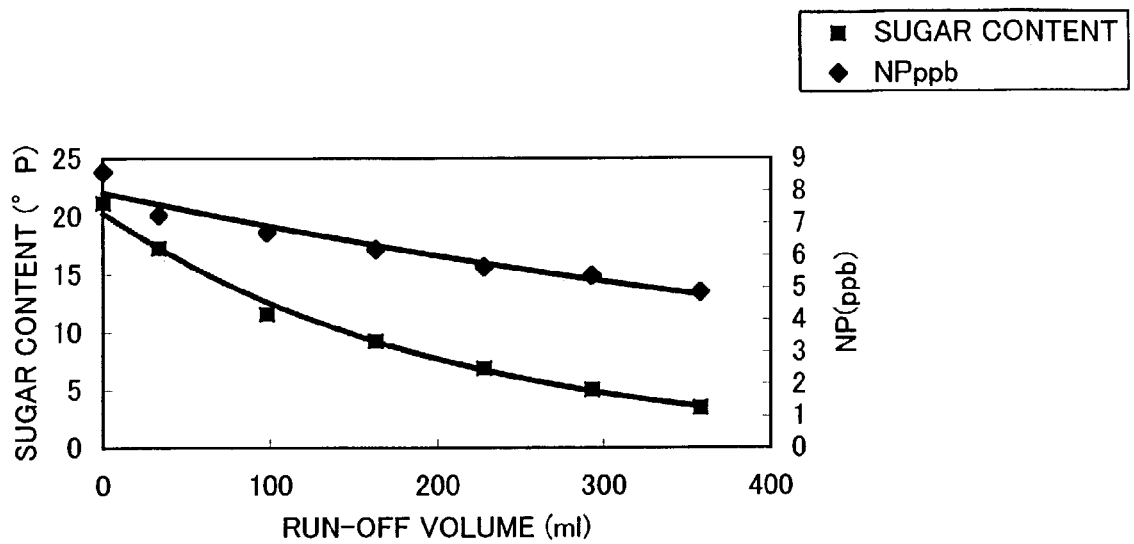
FIG. 1 shows the time-course change of sugar content and NP of the second wort run-off in the mash separation (lautering).

The production steps of fermented malt beverage such as beer and the like are roughly classified into: malt production process, wort production process (mashing and wort boiling accompanied with hop addition), beer production process (fermentation and maturation). The mash separation step after the above described mashing step comprises: draining off of the wort from the spent grains (called in general the first wort) containing the extract concentration of 16–20%, while the unsoluble part of the mash, spent grains, form the filter material; and eluting thereafter the extract content remaining in the spent grains by washing out (sparging) with hot water of approximately 80° C. to obtain the wort run-off with the extract content of approximately up to 1% (called in general the second wort). Hops are added to the mixture of both of the worts, which the mixture is then boiled in the subsequent wort boiling step. Accordingly, "the second wort" is the thiner wort running off when the spent grains are sparged after "the first wort" has run off, and "the whole wort" means the combined wort of the first and the second running off. Further, the term "wort" used in the phrase "wort for fermented malt beverages" means wort prepared from the foregoing types of wort.

There is no specific limitation as to a process for producing wort for fermented malt beverages of the present invention as long as the process for producing wort includes a reducing treatment of a stale flavor-causing substance in the second wort, in the mash separation in the production of fermented malt beverages, and as long as it enables to obtain the second wort with reduced content of a stale flavor-causing substance. Specific examples for the above mentioned fermented malt beverages are, beer of various kinds such as top-fermented beer, bottom-fermented beer, and the like, as well as "HAPPOSHU", a fermented malt beverage with lower ratio of malt used than in beer. Although a stale flavor-causing substance as mentioned above is not particularly limited, trans-2-nonenal and a substance which may turn into trans-2-nonenal, i.e. NP component, can be preferably exemplified. Also, a reducing treatment of a stale flavor-causing substance, in the above second wort, can be exemplified by a treatment performed using NP as an indicator. NP level can be determined, for instance, as an amount of trans-2-nonenal which is yielded after a certain amount (one fifth of the buffer) of wort is added to the acetic buffer adjusted to pH 4.0 and is heat-treated for two hours at 100° C.

With this NP as an indicator, in other words, with the determination of NP content in a given step for producing fermented malt beverages, fermented malt beverages with suppressed generation of a stale flavor can be produced by performing a reducing treatment of NP content in the second wort. For example, NP content in the whole wort where sugar content is adjusted to 11° p (Plato) usually ranges approximately between 7–10 ppb, although it depends on the types of beer. The production of fermented malt beverages with suppressed generation of a stale flavor substantially becomes possible by reducing the NP content in the whole wort at least by 1 ppb.

There is no specific limitation as to a treatment process to obtain the second wort in which the content of a stale flavor-causing substance such as NP component and the like is reduced, for instance, so that NP content is reduced at least by 1 ppb in the whole wort with its sugar content adjusted to 11° p. Some illustrations are a treatment process in which carry-over of a stale flavor-causing substance into the second wort is restricted, for instance, by suppressing its elution from the spent grains in the sparging step for the second wort, and a treatment process in which a stale flavor-causing substance is removed or reduced in the second wort. These treatment processes can be performed either alone or combined. By performing these treatment processes, content of a stale flavor-causing substance such as NP component or the like in the second wort can be reduced, finally the production of fermented malt beverages with suppressed generation of a stale flavor can be achieved.

As a treatment process to restrict the carry-over of a stale flavor-causing substance into the second wort, a process can be exemplified in which the elution of a stale flavor-causing substance from the spent grains in the sparging step for the second wort is suppressed. A more specific example is a process in which the extract retained by the spent grains is washed out under the acidic condition using hot water containing calcium salts and organic acids as hot water for the sparging, whereby a stale flavor-causing substance is less eluted. The calcium salts may be any salt as long as it can form calcium phosphate as a result of the reaction with phosphate ion in wort. The examples include calcium chloride, calcium sulfate, calcium bicarbonate, and the like. Alternatively, instead of the above mentioned calcium salts, other metallic salt can also be used as long as it can form an insoluble phosphate salt through the reaction with phosphate ion in the wort with a degree of not affecting the beverage quality. Preferable organic acids to be used along with the calcium salts are lactic acid, tartaric acid, acetic acid, and the like. Use of hot water comprising calcium salts and organic acids results in the formation of calcium phosphate, and decreasing the buffer action of wort. This means that the sparging can be carried out under the acidic condition depending on addition of a small quantity of organic acid. Although it depends on the amount of calcium salt added, the preferable pH range under the acidic condition is pH 5 or under for the hot water pH for preparation of the second wort.

As an alternative process to suppress the elution of a stale flavor-causing substance from the spent grains in the sparging step for the second wort, a process is exemplified in which hot water for the sparging which can lower the temperature in the spent grains layer draining off the first wort to 70° C. or under is used. This hot water for the sparging, which can lower the temperature in the spent grains layer to 70° C. or under, can be acidified in advance as described above, for example, by being supplemented with calcium salts and organic acids. Such hot water for the sparging for lowering the temperature and/or for the acidification will be used as sparge water from the upper part of the spent grains in case of a lauter type filtering equipment and as sparge water after the pressing-filtration in case of a mash filter type filtering equipment.

An alternative process to restrict the carry-over of a stale flavor-causing substance into the second wort as described above can be exemplified by a process to control the supply of hot water for the sparging so that the sparging is completed with sugar content of the second wort run-off not ranging below 3° p. As mentioned above, sugar content of the wort run-off in the sparging step gradually decreases in general in proportion to the increase in the sparge water amount. NP content in the second wort run-off, however, is kept at a high level without correlating to the decrease in sugar content, meaning that the carry-over of NP component into the second wort can be restricted by completing the sparging in a shorter duration, although the recovery of sugar in the sparging decreases.

Further, as an alternative process to suppress the elution of a stale flavor-causing substance into the second wort, a method can be exemplified in which the second wort is re-used during mashing process. This process of re-using the second wort during mashing process can be applied in any appropriate manner such as by adding the second wort to mashing-in liquor, to mashing-in liquor for adjuncts treatment, to mash during mashing, and the like. Other than these, the process can be applied in a manner where mashing-in water is partially replaced with the second wort. Although the second wort can be used in an appropriate amount which is obtained in an appropriate stage of the filtering step for the sparging, usually it is preferable to use a certain amount of wort obtained at the final stage of the sparging. This process is based on the following findings: NP content in the wort run-off holds a relatively high level, however, when the second wort containing NP, such as the mashing-in water replaced and added with the second wort, is used for the mashing, and then the wort is separated from the spent grains by lautering, there is no increase in the NP content in the wort, indicating that a treatment with the suppression of the NP component elution is achieved as a consequence. For example, it is set to remove a part of the second wort and the remaining second wort is combined with the first wort to obtain the wort in which NP content is reduced by approximately 1 ppb or more in terms of sugar content 11° p, whereas the removed second wort can be used as a replacement in the subsequent or even further mashing-in liquor.

There is no particular limitation as to a treatment process for removing or reducing a stale flavor-causing substance in the second wort as described above, and any process such as adsorption, filtration, coagulation, and the like can be applied to the removal or reduction of NP component in the second wort. One specific example is a process in which a part or a whole of the second wort is made to contact the activated carbon and have its NP component adsorbed thereto so that NP component is removed from or reduced in the wort. NP component can be removed from or reduced in the wort by applying the wort to the activated carbon column for the passage when the activated carbon is in the form of particle or powder, and simply by filtering when it is in the form of a panel.

The fermented malt beverages of the present invention such as beer and the like, in which a stale flavor generation is suppressed, will not be specified in particular as long as it is obtained by fermenting the wort produced by the process for producing wort for fermented malt beverages as described above in details. The specific examples include: a fermented malt beverage produced from wort for fermented malt beverages prepared with the second wort in which the content of a stale flavor-causing substance is reduced, being obtained through the reducing treatment of a stale flavor-causing substance in the second wort, with NP as an indicator for example; a fermented malt beverage produced by fermenting wort in which NP content in the whole wort from mash separation process is reduced at least by 1 ppb in terms of sugar content 11° p; a fermented malt beverage produced from wort for fermented malt beverages prepared with the second wort obtained by a treatment to suppress the elution of a stale flavor-causing substance from spent grains such as an elution treatment using hot water for the sparging which contains calcium salts and organic acids, and such as an elution treatment using hot water for the sparging which can lower the temperature in the spent grains to 70° C. or under; a fermented malt beverage produced from wort for fermented malt beverages prepared with the second wort obtained by a treatment to control the supply of hot water for the sparging so that the sparging is completed with sugar content of the second wort not ranging below 3° p; a fermented malt beverage produced from wort for fermented malt beverages prepared with the second wort obtained by performing an adsorptive removal treatment or a reducing treatment in which a part or a whole of the second wort is made to contact the activated carbon; and so on.

The present invention will be explained more specifically with reference to the following examples, but these examples will not limit the scope of the invention. Further, determination of NP contents in the following examples was carried out as follows: wort was added to 0.2 M acetate buffer, pH of which was adjusted to 4.0 with acetic acid and sodium acetate, with the amount of one fifth of the buffer; the buffer container was capped and the buffer with the wort was then heat-treated for two hours at 100° C., which was then cooled down to room temperature; trans-2-nonenal was extracted by a solid-phase extraction using a C18 cartridge, a Sep-Pak product, according to the method of Verhagen et al. (J. Chromatgr., 393 (1987) 85–96); trans-2-nonenal was then turned to a derivative by dansyl hydrazine; and the trans-2-nonenal was analyzed by HPLC ("HP1100"; Hewlett-Packard) employing a column switching method. In performing a column switching method, a 100×4.6 mm analytical column ("ODS-AM"; YMC-Pack) and a 250×4.6 mm analytical column ("ODS-AM", YMC-Pack) were used at a flow rate of 1.0 ml/min and 0.85 ml/min, respectively.

EXAMPLE 1

Figure 2:
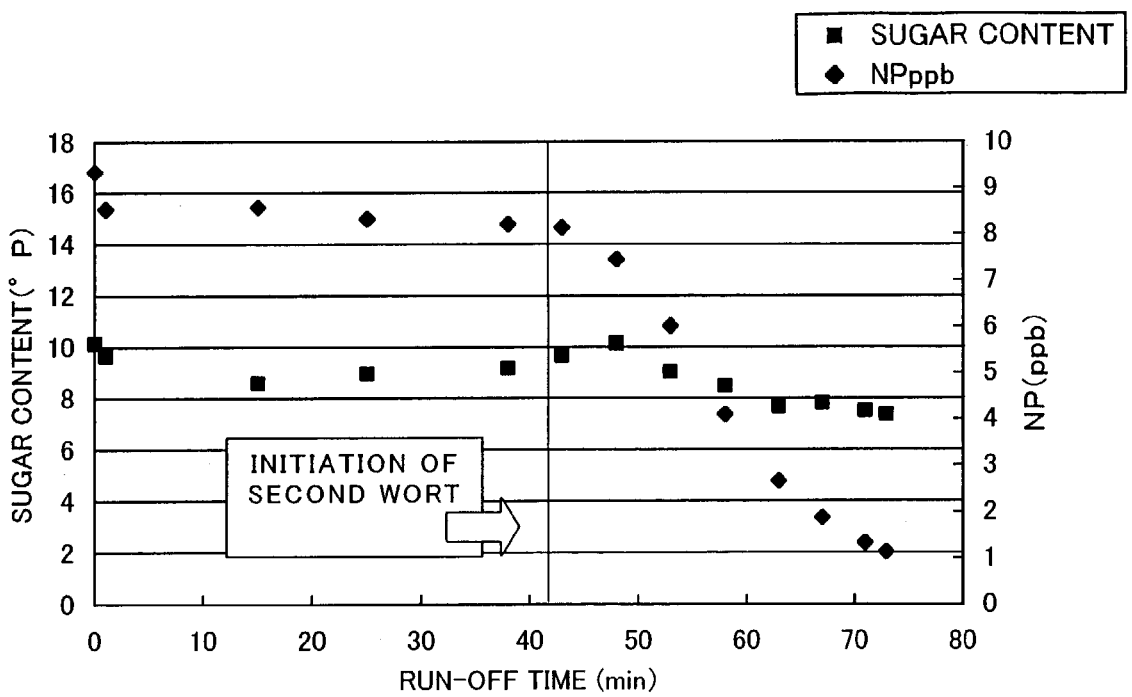
FIG. 2 shows the time-course change of sugar content and NP of the wort run-off in the mash separation (lautering).

Time-course Change of Sugar Content and NP in the Mash Separation 300 ml hot water was added to 100 g malt (malt:hot water=1:3) and the mixture was mashed at the temperature program of 30 min. at 50° C., 60 min. at 65° C. and 10 min. at 78° C. The resulting mash was filtered through a funnel using a filter paper ("#2", Toyo Roshi). After the filtration, hot water was sparged on the spent grains six different times, 70 ml each and the total of 420 ml. Sugar content and NP of each of the filtered liquids (the second wort run-off) were determined. Sugar content (° p) was calculated by measuring the specific gravity and from a conversion table. FIG. 1 shows the results. Likewise, the mash was filtered in a lauter tun in the KL level pilot plant, and sugar content and NP of the wort run-off were determined in time-course. The results are found in FIG. 2. The results shown in FIGS. 1 and 2 showed the fact that the decrease in NP was relatively smaller compared to the decrease in sugar content in the sparging. FIG. 2 particularly indicated that NP holds a high level without correlating to the decrease in sugar content, although sugar content in the wort is gradually decreased in general in proportion to the increase in the filtered liquid amount. These figures also show that no difference was observed between the NP contents in the first and second worts. These results together reveal that NP was eluted from the spent grains.

EXAMPLE 2

Reduced Amount of NP in the Whole Wort that is Effective for the Trans-2-nonenal Reduction in Beer The first wort and second wort were combined and two types of worts were prepared with different NP contents of 6.7 ppb and 7.4 ppb with the same sugar content of 11° p. Hops were added to the worts and the worts were then boiled. After the worts were cooled down, yeast was added to these two types of worts for fermentation and beer was prepared. After the bottling, they were stored for four days at 37° C., which were then determined for their trans-2-nonenal and a sensory test was performed at the same time. The trans-2-nonenal level in beer was proved to be 0.16 ppb from the wort of 6.7 ppb NP content and 0.19 ppb from the wort of 7.4 ppb NP content. The beer from the wort of 7.4 ppb NP content apparently released stronger stale flavor (cardboard flavor) in the sensory test. This result demonstrated that trans-2-nonenal level in beer can be decreased significantly when NP in the whole wort is decreased by about 1 ppb, thereby the generation of a stale flavor in beer is suppressed.

EXAMPLE 3

NP Reduction by Sparge Hot Water with Lower Temperature 300 ml hot water was added to 100 g malt (malt:hot water=1:3) and the mixture was mashed for 30 min. at 50° C., 60 min. at 65° C. and 10 min. at 78° C. Subsequently, hot water of 78° C. (experimental) and 100° C. (control) were aspersed five different times respectively, 100 ml each using a filter tube consisting of a thermal funnel. Then sugar content, pH and NP content in the whole worts were determined. In addition, the temperature in the spent grains layers in the mid-course of the sparging were 70° C. (experimental) and 80° C. (control), respectively. The results are shown in Table 1. Table 1 demonstrates that NP in the wort can be reduced by lowering the temperature of sparge hot water and thereby lowering the temperature in the spent grains.

TABLE 1

| Temperature of sparge hot water (temperature in the spent grains during filtration) | Sugar content (° p) | pH | NP The whole wort (NPppb) | NP The whole wort in terms of 11° p (NPppb) |
|---|---|---|---|---|
| 100° C. (80° C.) | 10.63 | 5.85 | 9.4 | 9.7 |
| 78° C. (70° C.) | 10.09 | 5.86 | 7.8 | 8.5 |

EXAMPLE 4

Reduction of NP by a Water Treatment of Sparge Hot Water 300 ml hot water was added to 100 g malt (malt:hot water=1:3) and the mixture was mashed for 30 min. at 50° C., 60 min. at 65° C. and 10 min. at 78° C., followed by filtration. Then hot water, which was treated with calcium chloride and lactic acid under the condition indicated in Table 2, was aspersed five different times, 100 ml each to obtain the filtered wort. The case using hot water without addition of the calcium chloride and the lactic acid served as the control. Table 3 shows the results. As shown in Table 3, NP in the wort can be reduced by performing filtration with sparge hot water treated with calcium salts and organic acids.

TABLE 2

|  | CaCl$_2$ (g/l) | Lactic acid (g/l) | pH |
|---|---|---|---|
| Control | 0 | 0 |  |
| Test 1 | 0.40 | 0.24 | 3.16 |
| Test 2 | 1.00 | 0.60 | 2.93 |

TABLE 3

|  | Sugar content (° p) | pH | NP The whole wort (NPppb) | NP The whole wort in terms of 11° p (NPppb) |
|---|---|---|---|---|
| Control | 10.09 | 5.86 | 8.1 | 8.8 |
| Test 1 | 10.13 | 5.67 | 6.7 | 7.3 |
| Test 2 | 10.16 | 5.36 | 6.2 | 6.7 |

EXAMPLE 5

Replacement Addition of the Second Wort to Mashing-in Liquor 300 ml hot water was added to 100 g malt (malt:hot water=1:3) and the mixture was mashed for 30 min. at 50° C., 60 min. at 65° C. and 10 min. at 78° C. After the first wort has run off, 350 ml hot water in total was sparged three different times, 100 ml, 100 ml and 150 ml, respectively. The last 150 ml was collected for the replacement addition in the subsequent mashing-in liquor.

The second wort collected for the replacement addition in the mashing-in liquor as described above had sugar content of 6.95° p and NP of 6.40 ppb. This second wort was added to the mashing-in liquor to replace by 20%. Then 300 ml of this hot water with replacement addition was added to 100 g malt (malt: hot water with replacement addition=1:3) and the mixture was mashed for 30 min. at 50° C., 60 min. at 65° C. and for 10 min. at 78° C. After the filtration for the first wort separation, 100° C. sparge hot water of 300 ml total was sparged three different times, 100 ml each. The results are shown in Table 4.

TABLE 4

|  | Sugar content (° p) | pH | NP The whole wort (NPppb) | NP The whole wort in terms of 11° p (NPppb) |
|---|---|---|---|---|
| Mashing-in liquor with 20% replacement addition | 13.39 | 5.87 | 8.07 | 6.7 |
| Mashing-in liquor with normal water | 13.22 | 5.87 | 7.95 | 6.5 |

The above results show that the resulting NP level in the wort was scarcely increased as opposed to the presumption that it would be increased in accordance with the amount of the second wort replaced with the mashing-in liquor when the second wort is partly used therein. This indicates that NP level will not be increased by the addition of the collected second wort to the subsequent brew, therefore, the combined use of the second wort, except the amount removed for the replacement, and the first wort as the filtered wort will lead to the suppression of a stale flavor as a consequence.

EXAMPLE 6

Reduction of NP by the Treatment of the Second Wort with the Activated Carbon 300 ml hot water was added to 100 g malt (malt:hot water=1:3) and the mixture was mashed for 30 min. at 50° C., 60 min. at 65° C. and 10 min. at 78° C. It was then filtered for the first wort separation. Subsequently, 300 ml hot water was sparged and only the second wort was collected. The activated carbon was added to 200 ml each of the second wort to the levels of 1000 ppm and 2000 ppm, which was then stirred for two minutes and filtered. NP levels in the filtered worts were determined. The results are found in Table 5. Table 5 demonstrates that NP levels were considerably decreased by the addition of the activated carbon, while the sugar contents showed little decrease.

TABLE 5

|  | Sugar content (° p) | pH | Total nitrogen (mg/100 ml) | NP (NPppb) | NP in terms of 11° p (NPppb) |
|---|---|---|---|---|---|
| Control | 7.85 | 6.04 | 76.4 | 6.17 | 8.65 |
| 1000 ppm added group | 7.79 | 6.02 | 71.8 | 0.93 | 1.31 |
| 2000 ppm added group | 7.74 | 6.03 | 66.9 | 0.47 | 0.67 |

INDUSTRIAL APPLICABILITY

The present invention makes it possible to obtain the second wort with the reduced content of a stale flavor-causing substance. By the use of this second wort with reduced content of a stale flavor-causing substance, fermented malt beverages such as beer and the like, in which generation of a stale flavor is suppressed, can be produced.

The invention claimed is:

1. A process for producing a wort product having a reduced content of a stale flavor-causing substance, the wort product comprising a whole wort having a first wort and a second wort, wherein the second wort is produced following filtration of the first wort with a mashing-in water, by providing hot water and carrying out filtration to produce the second wort in a filtration step,
   wherein said second wort is treated to reduce the trans-2-nonenal potential content of a stale flavor-causing substance in the second wort in a mash separation process so that the trans-2-nonenal potential in said whole wort from the mash separation process is reduced by at least 1 ppb when the sugar content of the whole wort is adjusted to 11° p, and wherein the trans-2-nonenal potential is determined as an indicator for stale-flavor in a fermented malt beverage.

2. The process for producing wort for fermented malt beverages according to claim 1, wherein the is a treatment to restrict a carry-over of trans-2-nonenal potential content from the spent grains into the second wort in a sparging step.

3. The process for producing wort for fermented malt beverages according to claim 2, wherein said treatment to restrict the carry-over of trans-2-nonenal potential content into the second wort is a treatment to suppress an elution of trans-2-nonenal potential content from the spent grains into the second wort in sparging step.

4. The process for producing wort for fermented malt beverages according to claim 3, wherein the treatment to suppress the elution of trans-2-nonenal potential is a treatment using hot water for the sparging which contains calcium salts and organic acids.

5. The process for producing wort for fermented malt beverages according to claim 3, wherein the treatment to suppress the elution of trans-2-nonenal potential is a treatment using hot water for the sparging which can lower a temperature in the spent grains layer to 70° C. or less.

6. The process for producing wort for fermented malt beverages according to claim 2, wherein the treatment to restrict the carry-over of trans-2-nonenal potential into the second wort is a treatment to control the supply of hot water for the sparging so that the sparging is completed with sugar content of the second wort not ranging below 3° p.

7. The process for producing wort for fermented malt beverages according to claim 1, wherein the treatment to reduce the content of trans-2-nonenal potential is a removing or reducing treatment of trans-2-nonenal potential from the second wort.

8. The process according to claim 7, wherein the removing of trans-2-nonenal potential from the second wort is a treatment in which a part or a whole of the second wort is made to contact an activated carbon.

* * * * *